US009527097B2

(12) United States Patent
Savage (10) Patent No.: US 9,527,097 B2
(45) Date of Patent: Dec. 27, 2016

(54) SPRAY COATING SYSTEM AND METHOD (71) Applicant: Torrent Systems, LLC, Elkhart, IN (US)

(72) Inventor: Lawrence Wayne Savage, Granger, IN (US)

(73) Assignee: Torrent Systems LLC, Elkhart, IN (US)

( * ) Notice: Subject to any disclaimer, the term of this patent is extended or adjusted under 35 U.S.C. 154(b) by 150 days.

(21) Appl. No.: 14/072,240

(22) Filed: Nov. 5, 2013

(65) Prior Publication Data

US 2015/0125609 A1    May 7, 2015

(51) Int. Cl.
| | | |
|---|---|---|
| *B05B 13/02* | (2006.01) | |
| *B05B 5/08* | (2006.01) | |
| *B05D 1/00* | (2006.01) | |
| *B05C 13/02* | (2006.01) | |
| *B05B 15/12* | (2006.01) | |

(Continued)

(52) U.S. Cl.
CPC ........... *B05B 13/0264* (2013.01); *B05B 5/082* (2013.01); *B05B 13/0235* (2013.01); *B05B 13/0292* (2013.01); *B05B 15/1207* (2013.01); *B05B 15/1244* (2013.01); *B05B 15/1288* (2013.01); *B05C 13/025* (2013.01); *B05D 1/002* (2013.01); *B05D 1/04* (2013.01); *H02H 7/003* (2013.01)

(58) Field of Classification Search
CPC ............ B05B 5/082; B05B 5/14; B05B 13/02; B05B 13/0207; B05B 13/0228; B05B 13/0242; B05B 13/0264; B05B 15/0425; B05B 15/0418; B05B 15/12; B05B 15/1288; B05C 13/00; B05C 13/02; B05C 13/025; B05C 15/00; B05D 1/002; B05D 1/02; B05D 1/04; B05D 1/06; B05D 1/322; B05D 2401/32; B05D 2510/10; B05D 2530/00; B05D 3/0218; B05D 3/0254; B05D 3/0281; B05D 3/0413; B05D 3/0486; B05D 7/544; B65G 17/20; B65G 2201/02; F26B 15/06; F26B 3/30; F26B 3/347
USPC ........................................................ 118/300
See application file for complete search history.

(56) References Cited

U.S. PATENT DOCUMENTS

| | | | |
|---|---|---|---|
| 2,445,451 A | | 7/1948 | Padelford |
| 2,598,466 A | * | 5/1952 | Tuttle .................... B05B 5/082 |
| | | | 118/633 |

(Continued)

FOREIGN PATENT DOCUMENTS

| | | |
|---|---|---|
| JP | 2002-136899 | 5/2002 |
| JP | 2006-007071 | 1/2006 |
| KR | 10-2008-0073995 | 8/2008 |

OTHER PUBLICATIONS

Sung Gon Kim, International Search Report for PCT Application PCT/US2013/070577, Aug. 8, 2014, Korean Intellectual Property Office, Daejeon Metropolitan City, Republic of Korea.

*Primary Examiner* — Karl Kurple
(74) *Attorney, Agent, or Firm* — Babcock IP, PLLC (57) ABSTRACT

A spray coating system has a wash enclosure with an enclosed wash space. A plurality of liquid tanks disperse liquids within the wash space via emitters. A spray enclosure has at least one spray port coupled to an enclosed spray space. A part hanger dimensioned to carry parts, is rotatable about a vertical axis while in the wash space and the spray space. A conveyor may be included, for example, for transporting the part hanger between the wash space and the spray space.

8 Claims, 8 Drawing Sheets

(51) Int. Cl.
    *B05D 1/04*     (2006.01)
    *H02H 7/00*     (2006.01)

(56) References Cited

U.S. PATENT DOCUMENTS

| | | | |
|---|---|---|---|
| 2,858,266 A * | 10/1958 | Schneider | C25D 17/08 204/297.09 |
| 3,378,018 A * | 4/1968 | Lawter | 134/109 |
| 3,724,472 A * | 4/1973 | Jenkins et al. | 134/93 |
| 3,744,449 A * | 7/1973 | Guttman | B05B 5/082 118/324 |
| 3,843,054 A * | 10/1974 | Kendall | B05B 5/032 118/620 |
| 3,913,523 A * | 10/1975 | Probst | B05B 5/032 118/626 |
| 4,009,301 A | 2/1977 | Heckman et al. | |
| 4,024,923 A * | 5/1977 | Broadbent | E21B 19/086 173/161 |
| 4,037,727 A * | 7/1977 | Kunkle | C25D 17/08 204/297.07 |
| 4,155,732 A | 5/1979 | Christian et al. | |
| 4,243,146 A | 1/1981 | Davitz | |
| 4,263,122 A * | 4/1981 | Urquhart | C25D 13/22 204/198 |
| 4,600,608 A * | 7/1986 | Ankrett | B05B 15/1233 118/326 |
| 4,628,859 A * | 12/1986 | Hines | B05B 5/082 118/500 |
| 4,668,358 A * | 5/1987 | Ball | C25D 13/22 118/47 |
| 4,736,760 A * | 4/1988 | Coberly | B08B 3/12 134/134 |
| 4,930,213 A * | 6/1990 | Hayakawa et al. | 29/793 |
| 4,953,495 A * | 9/1990 | Salisbury | B05B 5/082 118/308 |
| 5,099,787 A * | 3/1992 | Powers | 118/635 |
| 5,107,789 A | 4/1992 | Salisbury | |
| 5,124,177 A * | 6/1992 | Kasmark et al. | 427/202 |
| 5,147,050 A * | 9/1992 | Cullen | B05B 5/082 118/500 |
| 5,233,795 A * | 8/1993 | Reas | B24C 3/32 451/38 |
| 5,264,255 A * | 11/1993 | Salisbury | B05B 5/082 118/70 |
| 5,382,306 A * | 1/1995 | Plata et al. | 148/511 |
| 5,439,704 A | 8/1995 | Sankaran et al. | |
| 5,462,653 A * | 10/1995 | Hills | 210/85 |
| 5,531,334 A * | 7/1996 | Forby | B05B 13/02 118/500 |
| 5,598,099 A * | 1/1997 | Castleman | B05B 5/08 324/453 |
| 5,617,800 A * | 4/1997 | Moreschi et al. | 110/236 |
| 5,743,958 A * | 4/1998 | Shutic | B05B 7/1404 118/308 |
| 5,769,949 A | 6/1998 | Cienkus et al. | |
| 5,782,336 A * | 7/1998 | Venturelli | B65G 47/61 198/465.4 |
| 5,882,404 A * | 3/1999 | Gummer | B05B 15/1237 118/309 |
| 5,908,120 A * | 6/1999 | Yates | B05B 5/082 118/500 |
| 5,989,644 A * | 11/1999 | Williams | 427/424 |
| 6,056,821 A | 5/2000 | Nihongi | |
| 6,068,702 A | 5/2000 | Bertellotti et al. | |
| 6,158,448 A * | 12/2000 | Bahten et al. | 134/58 R |
| 6,203,859 B1 * | 3/2001 | Scheufler et al. | 427/475 |
| 6,325,899 B1 * | 12/2001 | DeWent | B05B 5/082 118/500 |
| 6,499,710 B1 * | 12/2002 | Mizuno | B60N 3/00 248/308 |
| 6,571,968 B1 * | 6/2003 | Cullen | 211/113 |
| 6,797,066 B2 | 9/2004 | Yoshino et al. | |
| 8,356,574 B2 | 1/2013 | Wurster | |
| 8,517,036 B2 * | 8/2013 | Calhoun | 134/199 |
| 8,535,752 B2 | 9/2013 | White et al. | |
| 2001/0046551 A1 * | 11/2001 | Falck | B05B 12/085 427/8 |
| 2002/0028299 A1 | 3/2002 | Yamane et al. | |
| 2002/0088874 A1 * | 7/2002 | Nolen | 239/200 |
| 2002/0139641 A1 * | 10/2002 | Taeger | 198/686 |
| 2003/0113473 A1 * | 6/2003 | Mann | 427/458 |
| 2003/0148029 A1 * | 8/2003 | Rosa | 427/236 |
| 2003/0170399 A1 * | 9/2003 | Owed | B05B 5/082 427/458 |
| 2003/0196594 A1 * | 10/2003 | Reed | B05B 13/0228 118/52 |
| 2004/0137144 A1 * | 7/2004 | Shutic | B05B 7/1404 427/180 |
| 2006/0011222 A1 * | 1/2006 | Lee | 134/61 |
| 2006/0231119 A1 * | 10/2006 | Yi | 134/1 |
| 2007/0160771 A1 * | 7/2007 | Sarajian | B05B 5/082 427/458 |
| 2007/0199506 A1 * | 8/2007 | Ahmed et al. | 118/66 |
| 2007/0246071 A1 * | 10/2007 | Streb | 134/18 |
| 2009/0056623 A1 * | 3/2009 | Crowley | B05B 5/082 118/324 |
| 2009/0211605 A1 * | 8/2009 | Ahmad | 134/18 |
| 2009/0217943 A1 * | 9/2009 | Raber et al. | 134/3 |
| 2009/0252880 A1 * | 10/2009 | Kurth | 427/372.2 |
| 2010/0101489 A1 * | 4/2010 | Wurster | B05B 15/1222 118/326 |
| 2010/0209615 A1 | 8/2010 | Makover et al. | |
| 2010/0255975 A1 * | 10/2010 | Mauchle | B04C 5/14 494/2 |

\* cited by examiner

SPRAY COATING SYSTEM AND METHOD

BACKGROUND

Field of the Invention

The invention relates to a system and method for spray coating a part, and more particularly a system and method utilizing compact enclosed wash and spray spaces in which the part is rotated during cleaning and covering.

Description of Related Art

Industrial spray coating systems typically utilize extended conveyors which convey the part(s) to be coated through multiple cleaning, heating, spraying and/or curing stages in a continuous serial process. These systems require a large space and may be relatively inflexible and/or energy inefficient with respect to changes in the type and/or numbers of parts operated upon and/or the specific cleaning and/or coating steps these parts may require.

Where electrostatic powder coating techniques are applied, the part requires a ground path between the part and ground, so that the electrostatically charged powdered coating material is attracted to and retained upon the part. A known issue in this type of coating process is the degradation of the ground path due to accumulated coating material also covering support elements, such as hangers or the like, as the part is conveyed through the coating stage, degrading the ground path through the support elements as additional parts are processed.

Additional process steps to regularly strip such accumulated material from the support elements may consume significant time and expense.

Another known quality and/or cost issue is the proper de-greasing, cleaning and/or pre-treatment of the part, prior to covering with the powdered material. Liquid agents sprayed upon the part during these steps may cross-contaminate one another if not applied separately. Further, these liquid agents may be a significant consumable cost of the process.

Competition in the spray coating industry has focused attention on process flexibility, quality control, labor requirements and overall reductions in manufacturing and installation costs.

Therefore, it is an object of the invention to provide a system and methods that overcome deficiencies in the prior art.

BRIEF DESCRIPTION OF THE DRAWINGS

The accompanying drawings, which are incorporated in and constitute a part of this specification, illustrate embodiments of the invention, where like reference numbers in the drawing figures refer to the same feature or element and may not be described in detail for every drawing figure in which they appear and, together with a general description of the invention given above, and the detailed description of the embodiments given below, serve to explain the principles of the invention.

DETAILED DESCRIPTION

The inventors have recognized that the prior sequential stage linear path conveyor spray coating systems are inherently inefficient and inflexible.

Figure 1:
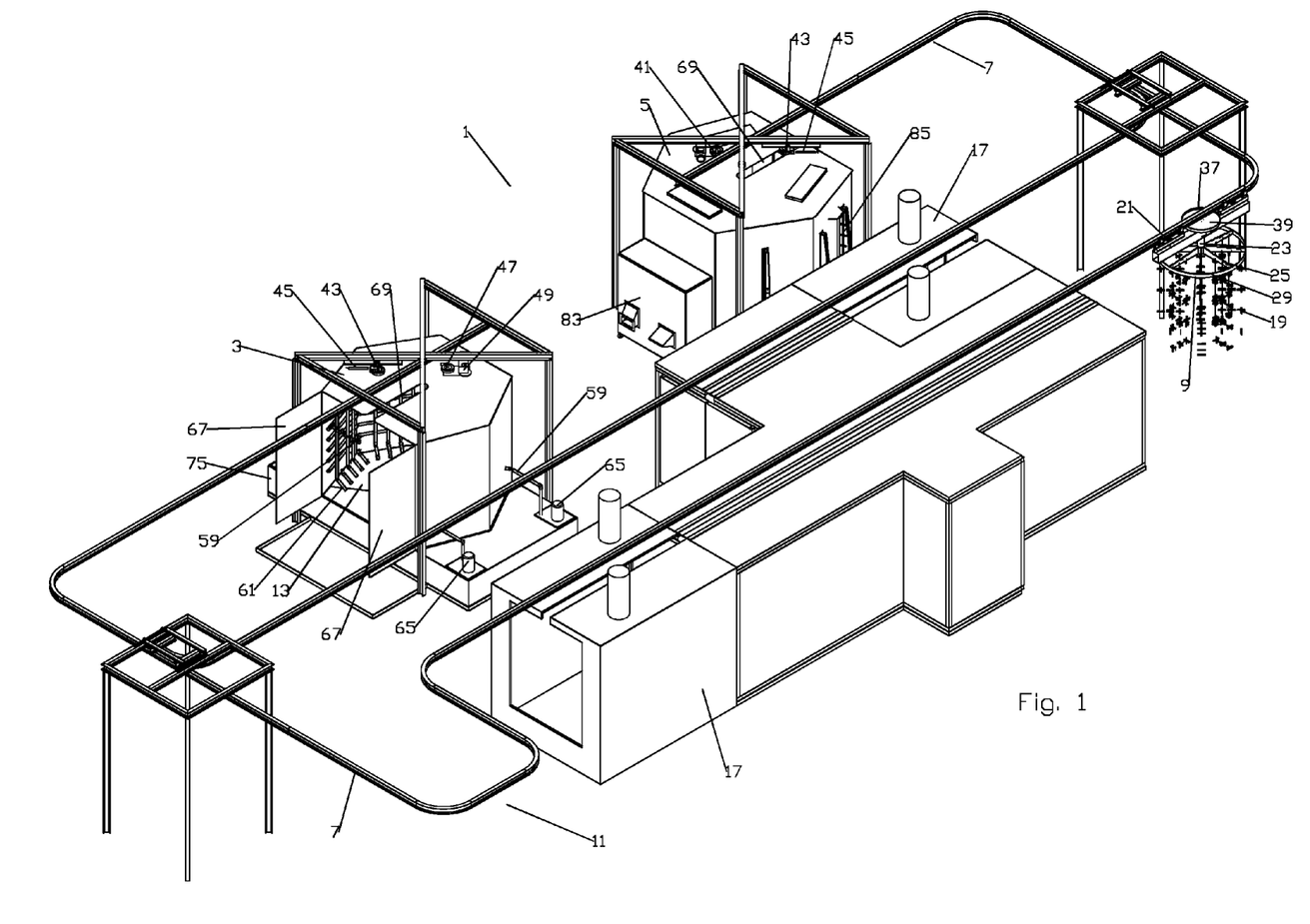
FIG. 1 is a schematic isometric view of an exemplary spray coating system.
Figure 2:
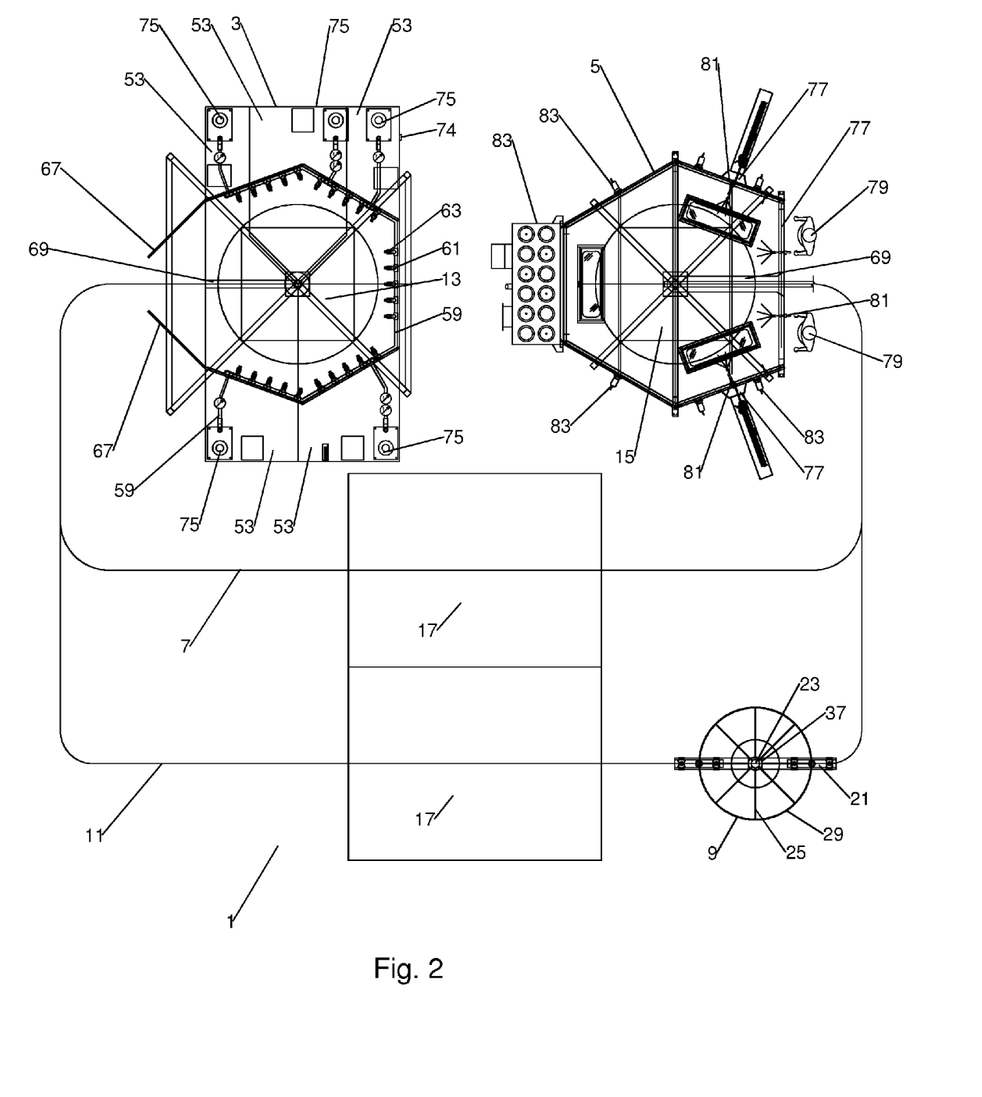
FIG. 2 is a schematic top view on an exemplary spray coating system, with tops of the wash and spray enclosures removed for clarity.

As shown for example in FIGS. 1 and 2, a modular spray coating system 1 includes a wash enclosure 3, a spray enclosure 5 and a conveyor 7 with a part hanger 9 movable along the conveyor 7 between, for example, a load/unload station 11, a wash space 13 of the wash enclosure 3 and a spray space 15 of the spray enclosure 5. Depending on the requirements of the coatings applied, heaters 17 may also be included along the conveyor 7 for drying/pre-heating the part hanger 9 and parts 19 thereon after washing and/or for melt/drying/curing of coatings applied to the parts 19 while in the spray space 15.

The conveyor 7 may be a pathway created from, for example, I-beam rail sections from which the part hanger 9 is slidably suspended. Alternatively, the part hanger 9 may be manually transported between the enclosures. As best shown for example in FIG. 3, the part hanger 9 is rotatable about a vertical axis, for example, suspended from one or more carriage assemblies 21. Portions of the part hanger 9 exposed to the process may be hung from a drop shaft 23 to minimize the potential for rail section fouling from cleaning and/or spray operations performed on the part hanger 9 and parts 19 hung therefrom.

Figure 3:
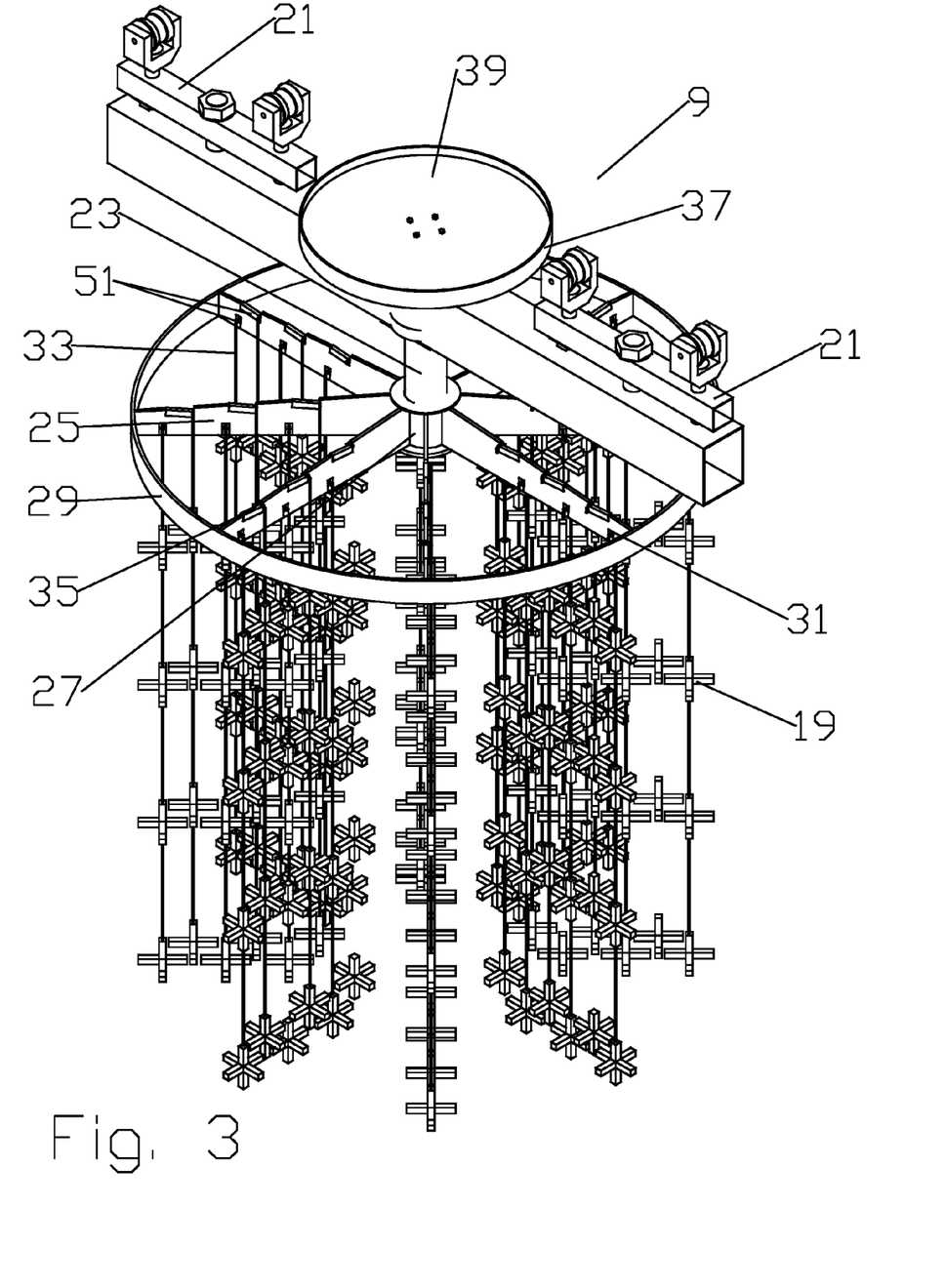
FIG. 3 is a schematic isometric view of a part hanger loaded with exemplary parts.

The part hanger 9 may be provided, for example, in a generally circular wheel or polygonal configuration with a plurality of spokes 25 extending from a hub 27 to a rim 29, the spokes 25 and/or rim 29 provided with hanger holes 31 spaced there along. The hanger holes 31 may be dimensioned to receive hangers 33 to which the parts 19 are coupled, for example by hooks, clips, lines or the like. Further mounting points 35 may be provided along the top edges of the rim 29 and/or spokes 25. The many hanger holes 31/mounting points 35, allow for ease of spacing the parts 19 away from one another and/or distributing the parts so that the part hanger 9 may be balanced with respect to its vertical axis, depending upon the size and number of the parts 19 being processed together. Alternatively, where a single large part 19 is being processed, this may be suspended directly from the hub 27 or multiple locations.

Figure 4:
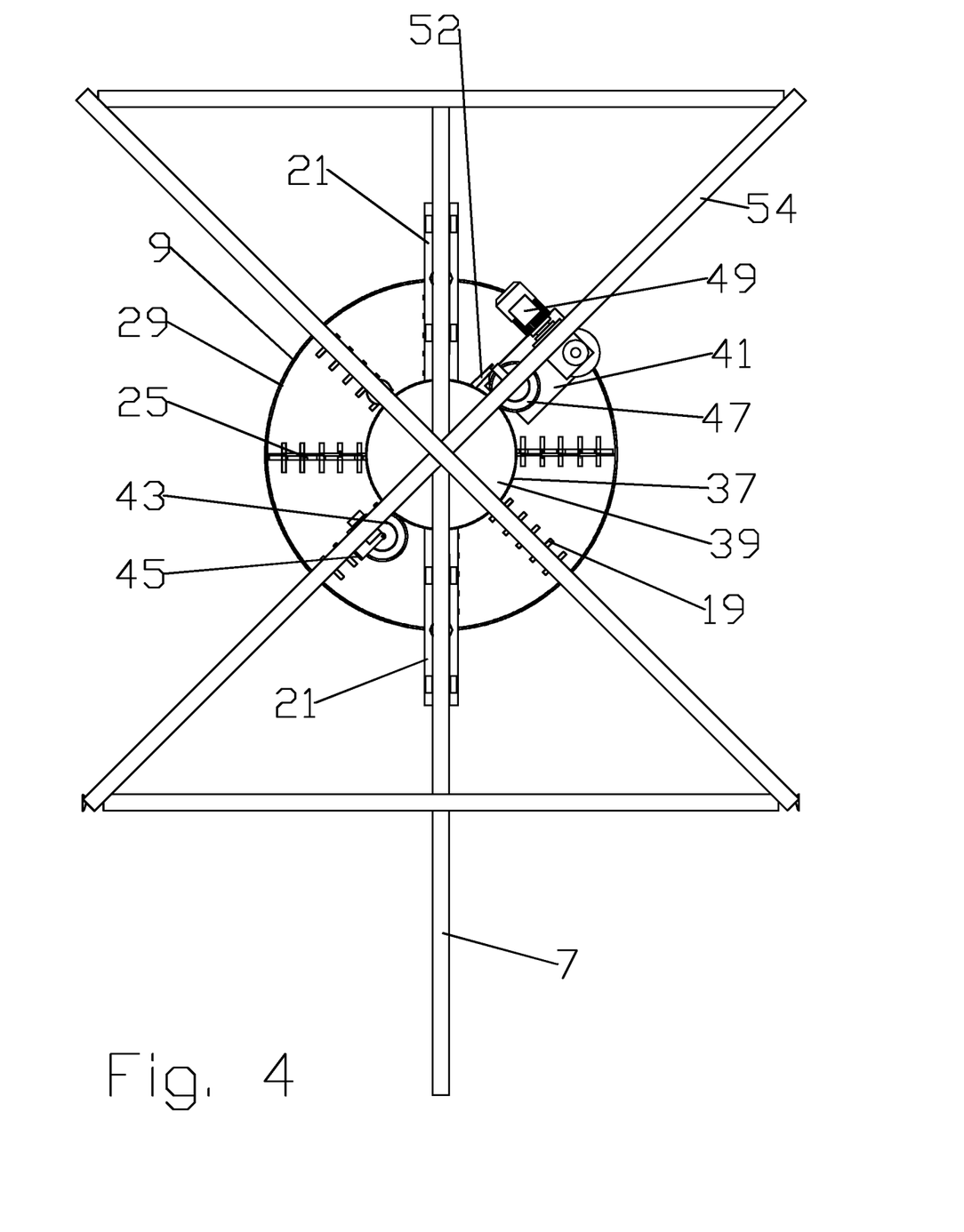
FIG. 4 is a schematic top view of a part hanger positioned engaged with a super structure mounted drive arrangement, for rotation of the part hanger.

Rotation of the part hanger 9 may be driven by engaging a drive surface 37 provided proximate an upper end of the drop shaft 23, provided for example as the outer rim of a drive disk 39 or gear. As best shown in FIG. 4, a drive arrangement 41 coupled to supporting super structure may be dimensioned for securely engaging and rotating the drive disk 39. The drive arrangement 41 may include a retaining wheel 43 mounted upon an actuator 45, the retaining wheel 43 and actuator 45 configured to bias the drive disk against the drive wheel 47 of a motor 49 or the like, when the part hanger 9 has been positioned along the conveyor 7 with respect to the wash or spray space 13, 15. Alternatively, the actuator 45 moves the retaining wheel 43 aside, to allow removal of the part hanger 9 along the conveyor 7.

For electrostatic coating processes, one skilled in the art will appreciate that it is important to provide an electrical ground path between each part to be coated and an earth ground so that the positively charged powdered material in the spray space 15 is attracted to each part. If the ground path is degraded, the attraction between the powdered material and the part 19 may be similarly degraded, reducing the quality and/or coverage of the resulting coating.

Figure 5:
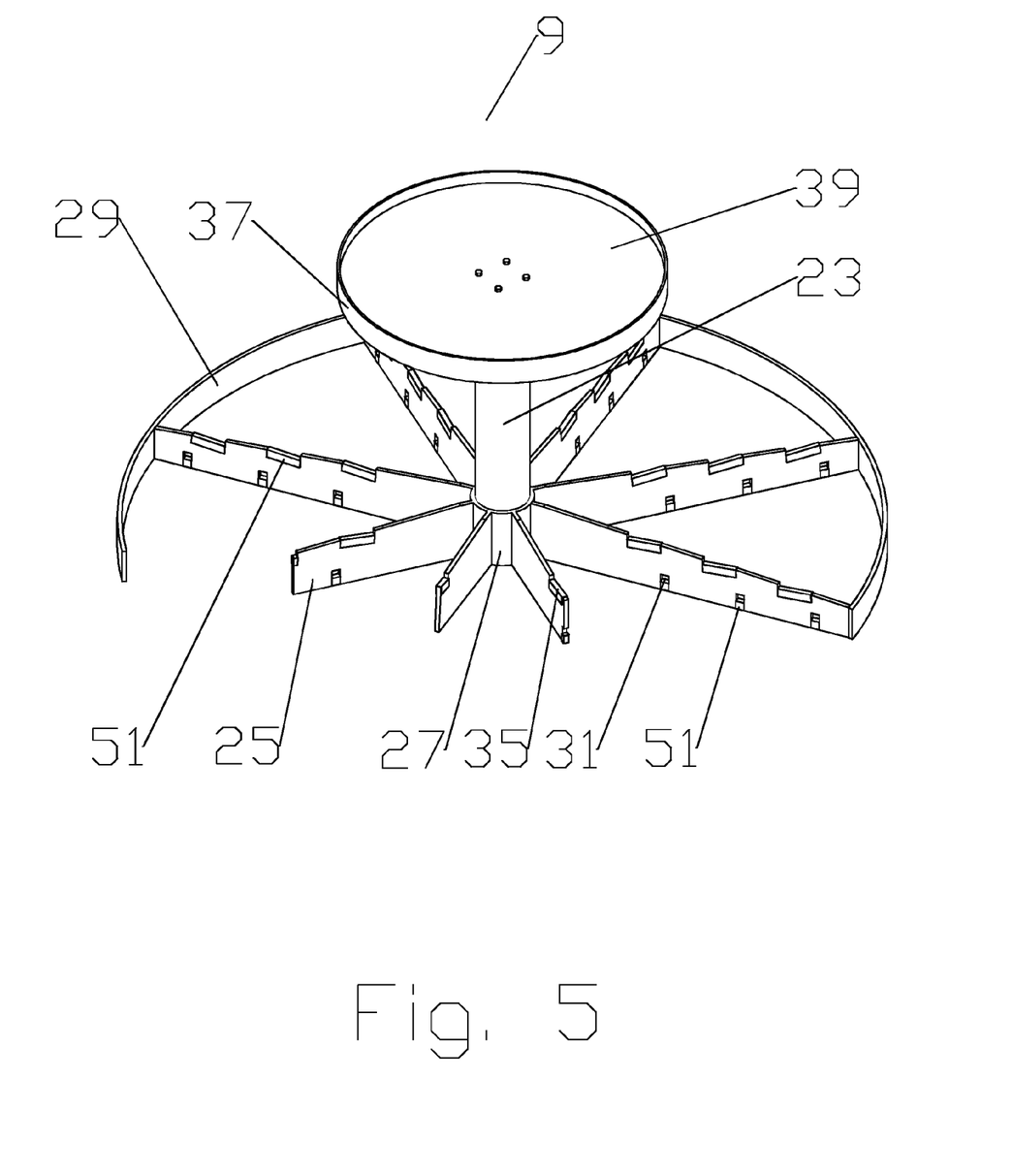
FIG. 5 is a schematic isometric partial cut-away view of rotating elements of the part hanger, demonstrating cover clips seated upon hanger holes and mounting points.

The part hanger 9 may be exposed in both the wash and spray spaces 13, 15, resulting in the build-up of material which may degrade the electrical continuity between hangers 33 and the hanger holes 31 or mounting points 35. To extend periods between periodic cleaning of the entire part hanger 9, cover clips 51 may be applied between the part hanger 9 and the hangers 33 the parts 19 are coupled to. As best shown in FIG. 5, the cover clips 51 may be generally U-shaped, dimensioned to grasp the width of the spoke 25 or rim 29 it is mounted upon. Thereby, the ground path between the part 19 and earth ground passes through the hanger 9, the cover clip 51 and part hanger 9 which may itself be coupled to ground, for example, by a wiper 52 engaging the drive surface 37 or the like (see FIG. 4).

As material build-up occurs, the cover clips 51 and/or hangers 33 that become coated may be quickly exchanged for uncoated cover clips 51 and/or hangers 33, saving the system downtime and expense of manually cleaning the entire part hanger 9. The fouled cover clips 51 and hangers 33 may be disposable or cost efficiently cleanable via, for example, solvent immersion or the like, due to their relatively small dimensions, compared to the part hanger 9.

Figure 6:
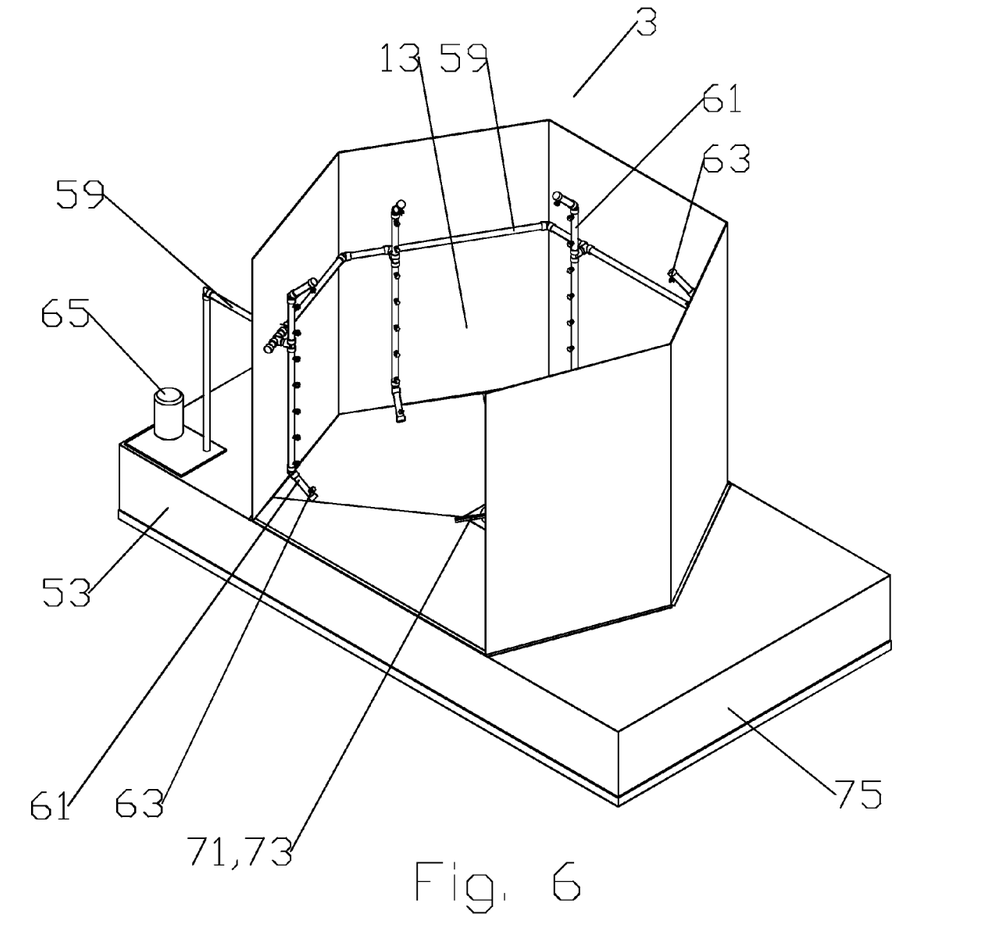
FIG. 6 is a schematic isometric view of a wash enclosure, demonstrating a single liquid tank and associated periphery header and risers.
Figure 7:
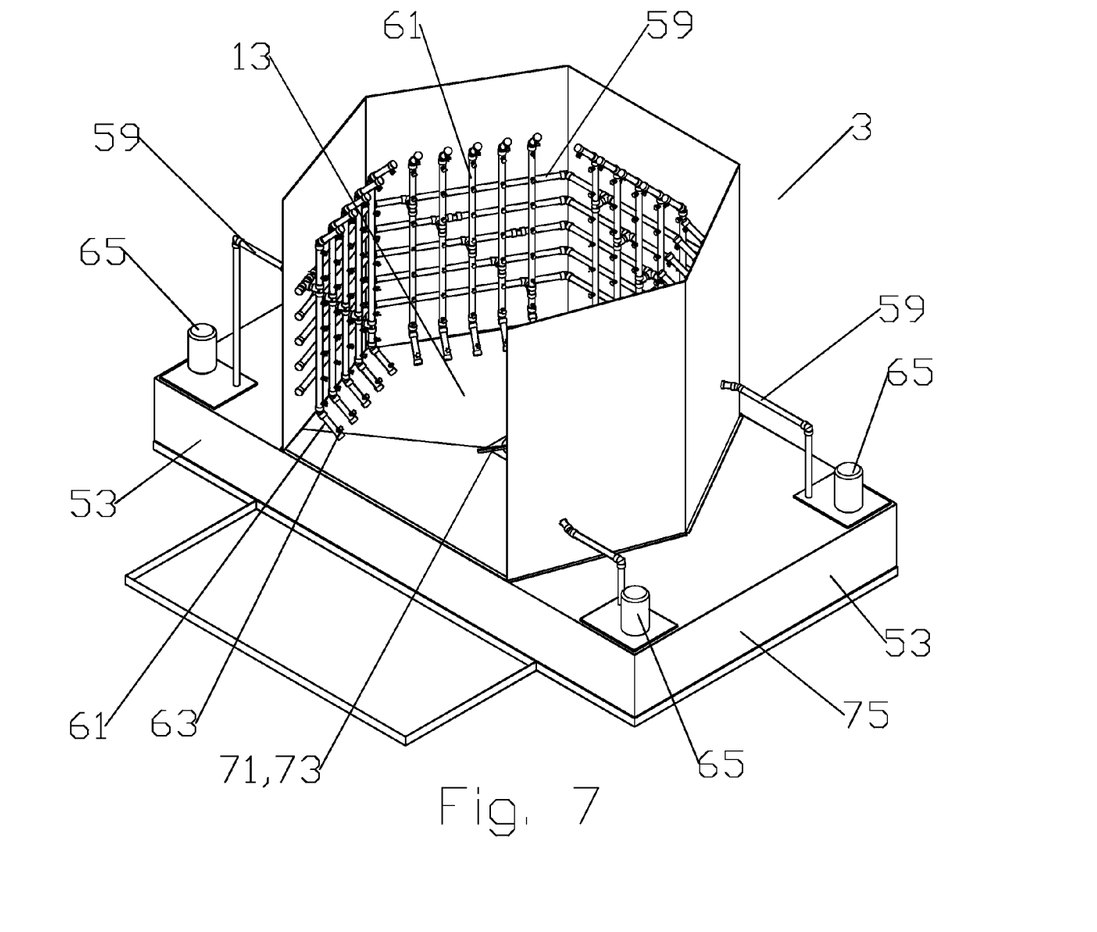
FIG. 7 is a schematic isometric view of a wash enclosure, demonstrating periphery headers and risers for five separate liquid tanks.

The wash enclosure 3, as best shown in FIGS. 6 and 7, provides an enclosed wash space 13 wherein cleaning agents stored in liquid tanks 53 may be dispersed through emitters 63 to coat/clean the parts 19 rotating with the part hanger 9 within the wash space 13. Cleaning agents may include, for example, high temperature water, steam, acid and/or caustic solutions, phosphates, detergents, degreasers or the like.

To disperse/project the cleaning agents, each cleaning agent may be distributed from its liquid tank 53 via a periphery header 59 which extends around a periphery of the wash space 13 along an inner or outer side of a sidewall of the wash space 13. A plurality of risers 61 are spaced along each of the periphery headers 59. The risers 61 may each include a plurality of emitters 63, such as slots, nozzles and/or spray heads, enabling tuning of the distribution of the respective cleaning agent upon the parts 19 from multiple sides and vertical positions with respect to the wash space 13, as the parts 19 are rotated within the wash space 13 via the rotation of the part hanger 9. Flow rate and/or spray pressure of the cleaning agent may be controlled, for example, by a pump 65 positioned between each liquid tank 53 and its periphery header 59. Depending upon the type of cleaning agent, an inline heater, such as a heat exchanger or the like (not shown) may be applied to enable delivery of heated cleaning agent to the wash space 13.

The wash space 13 may be further enclosed by doors 67 which open to receive the part hanger 9 and an enclosing ceiling provided with a part hanger slot 69 dimensioned to receive the dropshaft 23 there along (See FIGS. 1 and 2).

The cleaning agents may be recovered to their respective liquid tanks 53 through a floor drain 71 of the wash space 13, routed to the proper liquid tank 53 by the orientation of a rotatable drain valve 73 forming a return drain path selectable, for example, between a module outlet 74, such as an external waste drain, and each of the liquid tanks 53, according to a rotation angle of the rotatable drain valve 73. Alternatively, a valve manifold or the like may be applied to open/close a desired return drain path according to the cleaning agent/cycle type that is in use.

Where the liquid tanks 53 are provided in a base 75 of the wash enclosure 3, the return drain path may be configured for liquid flow entirely via gravity, without the need for additional pumping equipment.

Figure 8:
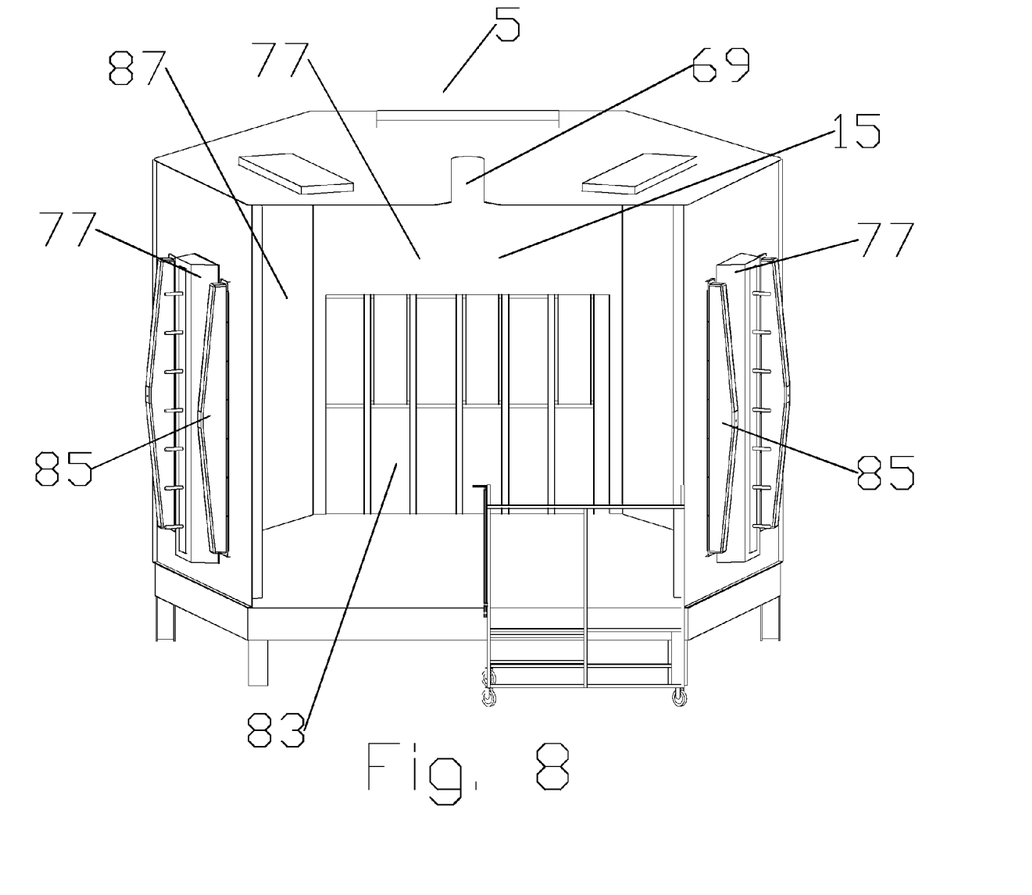
FIG. 8 is a schematic isometric angled front view of a spray enclosure.

The spray enclosure 5, as best shown in FIG. 8, provides a spray space 15 where the parts 19 may be coated as the part hanger 9 is rotated there within, for example by spraying upon the parts 19 through a spray access 77. The spray access 77 may be, for example, the entry passage for the part hanger 9, where one or more human operators 79 (see FIG. 2) may be positioned to manually spray into the spray space 15. The spray enclosure 5 may include additional spray access 77, for example for automated spray guns 81 or the like, requiring the one or more operators 79, if present, to provide only touch up spraying of any uncoated areas of the parts 19 that may be observed.

Although the spray space 15 may be generally open to the surrounding area via the spray access 77 being dimensioned large enough to receive the part hanger 9, without application of additional doors or the like, coating materials sprayed into the spray space 15 upon and around the parts 19 may be generally contained within the spray space 15 by air flow ducting configured to guide airflow through the spray access 77, across the parts 19 and out through an exhaust stack 83 including bag filters or the like.

Further concentration of the spray material around the parts 19 may be obtained by, for example, adding planar air flow inlets 85 along the spray space sidewalls 87. The planar air flow inlets 85 create air currents, similar to an air curtain, swirling about the parts 19, resulting in greater latency of the spray material about the parts 19, before the air carrying any remaining unattached spray material finally moves toward the exhaust stack 83.

A part hanger slot 69 may also be applied to the spray enclosure ceiling to improve containment of the spray space 15, without inhibiting entry/exit of the part hanger 9. Spray material recovery apparatus for gathering spray material not attached to the parts during the spraying may be applied to the floor of the spray space and/or exhaust stack 83 to enable excess spray material collection and/or re-use.

In use, the part hanger 9 may be loaded with parts 19 at a load/unload station 11 and the part hanger 9 moved along the conveyor 7 into the wash enclosure 3 and engagement with the drive arrangement 41 for part hanger 9 rotation. With the doors 67 closed, a cleaning and/or rinse cycle may be applied with a selected program of cleaning agents circulated from and returned to the respective liquid tanks 53 and/or the module outlet 74 for selected flow rates/periods.

The cleaned part hanger 9 and parts 19 may then be moved along the conveyor 7 from the wash enclosure 3 to and/or through a heater 17 operating as a dryer/pre-heater according to the requirements of the spray material being applied.

Dried and/or preheated as desired, the part hanger 9 may then be moved along the conveyor 7 to the spray enclosure 5 and into the spray space 15/engagement with the drive arrangement 41 thereof for part hanger 9 rotation. Spray material is then applied upon the rotating parts 19 through the spray access via automatic and/or manual spraying. As the parts 19 rotate, the various sides of the parts 19 are exposed to each spray access 77, facilitating even and/or complete part 19 coverage with the selected coating material.

Where electrostatic spraying is applied, an electrical ground 54 coupled wiper 52 engaging, for example, the drive surface 37 of the drive disk 39, completes a ground path between the parts 19, hanger 33, cover clip 51 and part hanger 9, so that positively charged powdered material emitted from the sprayer guns 81 is attracted to and retained upon the surface of the parts 19.

The part hanger 9 with coated parts 19 is then moved along the conveyor 7 from the spray space 15 to a heater 17 for melting, drying and/or curing the coating material upon the parts 19. Moved along the conveyor 7 to a load/unload station 11, the coated parts 19 may be unloaded and the part hanger 9 readied for re-use by exchanging the cover clips 51 and/or hangers 33 as need be.

One skilled in the art will appreciate that although the spray coating system 1 figures demonstrate a single part hanger 9 in use, for figure clarity purposes, multiple part hangers 9 may be provided along the conveyor 7 so that while one part hanger 9 and parts 19 thereon is undergoing washing, heating, spraying, final heating/curing and/or loading/unloading, other part hangers 9 may be at other stations along the system, increasing system throughput. Further, the conveyor may include a conveyor transport arrangement for powered/automated travel there along, such as a drive, gear, chain or belt transport system. As these conveyor transport arrangements are well known in the art, further detail of such is not included herein.

From the foregoing, it will be apparent that the spray coating system 1 and methods disclosed enable a significant space, energy consumption and production flexibility improvement over the prior coating systems. In particular, the spray coating system 1 is easily adaptable to operate upon a wide range of different parts and their specific coating requirements, even processing of different types of parts according to custom requirements thereof at different stations of the system, simultaneously.

| Table of Parts | |
|---|---|
| 1 | spray coating system |
| 3 | wash module |
| 5 | spray module |
| 7 | conveyor |
| 9 | part hanger |
| 11 | load/unload station |
| 13 | wash space |
| 15 | spray space |
| 17 | heater |
| 19 | part |
| 21 | carriage assembly |
| 23 | drop shaft |
| 25 | spoke |
| 27 | hub |
| 29 | rim |
| 31 | hanger hole |
| 33 | hanger |
| 35 | mounting point |
| 37 | drive surface |
| 39 | drive disk |
| 41 | drive arrangement |
| 43 | retaining wheel |
| 45 | actuator |
| 47 | drive wheel |
| 49 | motor |
| 51 | cover clip |
| 52 | wiper |
| 53 | liquid tank |
| 54 | electrical ground |
| 55 | emitter |
| 59 | periphery header |
| 61 | riser |
| 63 | emitter |

| Table of Parts -continued | |
|---|---|
| 65 | pump |
| 67 | door |
| 69 | part hanger slot |
| 71 | floor drain |
| 73 | drain valve |
| 74 | module outlet |
| 75 | base |
| 77 | spray access |
| 79 | operator |
| 81 | spray gun |
| 83 | exhaust stack |
| 85 | planar air flow inlet |
| 87 | spray space sidewall |

Where in the foregoing description reference has been made to ratios, integers, components or modules having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

I claim:

1. A spray coating system, comprising:
a wash enclosure with an enclosed wash space;
a plurality of liquid tanks, each of the liquid tanks coupled to a plurality of emitters arrayed to disperse a liquid from each liquid tank within the enclosed wash space;
a spray enclosure with at least one spray access coupled to a spray space;
a part hanger rotatable about a vertical axis said part hanger including a spoke and a rim; a hanger configured to couple to a part to be processed;
a removable cover clip seated upon a mounting point of the part hanger or a hanger hole of the part hanger, said removable cover clip is located between the part hanger and the hanger,
the removable cover clip provided with a U-shaped cross-section, said removable cover clip is mounted to the part hanger with the cover clip grasping a width of the spoke or the rim of the part hanger; contact between the hanger and the removable cover clip and contact between the part hanger and the removable cover clip form an electrical ground path through the hanger, the removable cover clip, and the part hanger to an electrical ground; a plurality of the removable cover clips and a plurality of the hangers applied to the part hanger; and the part hanger transferable between the enclosed wash space and the spray space; wherein the part hanger is rotatable while in the enclosed wash space and the spray space.

2. The system of claim 1, further including a conveyor dimensioned to transfer the part hanger between the enclosed wash space and the spray space.

3. The system of claim 1, wherein the ground path between the plurality of hangers of the part hanger and ground is maintained during rotation of the part hanger by a wiper biased against the part hanger.

4. The system of claim 1, wherein the conveyor includes a track, the part hanger slidable along the track; the part hanger extended from the track by a drop shaft.

5. The system of claim 1, further including a rotatable drain of the wash enclosure; the rotatable drain forming a return drain path selectable between a module outlet and at least one of the liquid tanks, according to a rotation angle of the rotatable drain.

6. The system of claim 1, wherein each of the liquid tanks is coupled to a separate periphery header extending around a periphery of the enclosed wash space, each of the periphery headers coupled to a plurality of risers spaced along each of the periphery headers, the risers extending from each of the periphery headers with a plurality of the emitters projecting therefrom to disperse the liquid of the liquid tank within the enclosed wash space.

7. The system of claim 1, further including a heater; the heater provided along the conveyor between the wash enclosure and the spray enclosure; the heater dimensioned to receive the part hanger.

8. The system of claim 1, wherein the spray enclosure includes a drive arrangement dimensioned to engage with and rotate the part hanger, while the part hanger is within the spray space.

* * * * *